(12) United States Patent
Kumakura et al.

(10) Patent No.: US 10,702,932 B2
(45) Date of Patent: Jul. 7, 2020

(54) POWER TOOL HAVING FIRST ELASTIC MEMBER AND SECOND ELASTIC MEMBER ACCOMMODATED IN FIRST GEAR

(71) Applicant: Hitachi Koki Co., Ltd., Tokyo (JP)

(72) Inventors: Takeru Kumakura, Hitachinaka (JP); Shinji Kuragano, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 289 days.

(21) Appl. No.: 15/556,251

(22) PCT Filed: Feb. 26, 2016

(86) PCT No.: PCT/JP2016/055841
§ 371 (c)(1),
(2) Date: Sep. 6, 2017

(87) PCT Pub. No.: WO2016/158131
PCT Pub. Date: Oct. 6, 2016

(65) Prior Publication Data
US 2018/0050398 A1    Feb. 22, 2018

(30) Foreign Application Priority Data

Mar. 31, 2015 (JP) .................................. 2015-071705
May 20, 2015 (JP) .................................. 2015-102584

(51) Int. Cl.
*H02K 7/14* (2006.01)
*H02K 7/116* (2006.01)
(Continued)

(52) U.S. Cl.
CPC ............. *B23D 45/16* (2013.01); *B23D 47/12* (2013.01); *B25F 5/00* (2013.01); *B27B 5/29* (2013.01);
(Continued)

(58) Field of Classification Search
CPC ........ H02K 7/116; H02K 7/1163; H02K 7/14; H02K 7/145; H02K 7/16; H02K 11/20;
(Continued)

(56) References Cited

U.S. PATENT DOCUMENTS 5,650,704 A * 7/1997 Pratt ......................... B25J 9/10
318/560
6,155,364 A * 12/2000 Nagano .................. B60K 6/365
180/65.235
(Continued)

FOREIGN PATENT DOCUMENTS

CN       102056714 A     5/2011
CN       103348581 A    10/2013
(Continued)

OTHER PUBLICATIONS

European Patent Office Extended Search for EP16772015.0 dated Nov. 22, 2018, 5 pages.
(Continued)

*Primary Examiner* — Nguyen Tran
*Assistant Examiner* — David A. Singh
(74) *Attorney, Agent, or Firm* — Kilpatrick Townsend & Stockton LLP

(57) ABSTRACT

To provide a power tool configured to stably rotate an end tool. The provided power tool includes a brushless motor including a rotor configured to rotate; a rectifier circuit configured to rectify an AC voltage; a smoothing capacitor configured to smooth the AC voltage rectified by the rectifier circuit to a pulsating voltage; an inverter circuit configured to perform switching operations to output the pulsating voltage to the brushless motor; a deceleration mechanism including: a driving portion at a rotor side, a driven portion configured to transmit a rotating force to an end tool side, and an elastic member configured to transmit a rotational
(Continued)

force of the driving portion to the driven portion, the deceleration mechanism configured to decelerate a speed of a rotation of the rotor and configured to transmit the rotation to an end tool.

11 Claims, 9 Drawing Sheets

(51) Int. Cl.
- H02K 7/16 (2006.01)
- H02K 11/21 (2016.01)
- B23D 45/16 (2006.01)
- B23D 47/12 (2006.01)
- B25F 5/00 (2006.01)
- B27B 5/29 (2006.01)
- B27B 9/00 (2006.01)
- H02K 27/20 (2006.01)
- H02K 51/00 (2006.01)
- H02K 29/14 (2006.01)

(52) U.S. Cl.
CPC ............ *B27B 9/00* (2013.01); *H02K 7/116* (2013.01); *H02K 7/145* (2013.01); *H02K 7/16* (2013.01); *H02K 11/21* (2016.01); *H02K 27/20* (2013.01); *H02K 29/14* (2013.01); *H02K 51/00* (2013.01)

(58) Field of Classification Search
CPC ........ H02K 11/21; H02K 27/20; H02K 29/14; H02K 51/00; B23D 45/16; B23D 47/12; B25B 21/008; B25F 5/00; B25F 5/001; B27B 5/29; B27B 5/30; B27B 5/32; B27B 9/00
USPC ...... 310/10, 40 R, 50, 83, 99; 173/2, 4, 5, 6, 173/7, 11, 176, 179
See application file for complete search history.

(56) References Cited

U.S. PATENT DOCUMENTS

| | | | |
|---|---|---|---|
| 2005/0224245 A1 | 10/2005 | Kamimura et al. | |
| 2006/0194666 A1* | 8/2006 | Zimmermann | F16H 1/125 475/149 |
| 2010/0105514 A1* | 4/2010 | Dames | F16H 35/10 475/257 |
| 2010/0206649 A1* | 8/2010 | Ishii | B60K 6/26 180/65.31 |
| 2011/0094806 A1* | 4/2011 | Mack | B60L 50/16 180/65.6 |
| 2011/0138954 A1* | 6/2011 | Tokunaga | B23D 47/12 74/473.1 |
| 2011/0185864 A1* | 8/2011 | Ide | B25B 23/147 81/479 |
| 2011/0297410 A1* | 12/2011 | Numata | B25F 5/006 173/217 |
| 2012/0227527 A1* | 9/2012 | Ikuta | B23Q 5/56 74/411 |
| 2012/0286629 A1* | 11/2012 | Johnson | B25J 9/08 310/68 B |
| 2013/0008274 A1* | 1/2013 | Mori | B60K 6/48 74/421 A |
| 2013/0207446 A1* | 8/2013 | Marro | B60K 7/0007 301/6.5 |
| 2013/0207590 A1 | 8/2013 | Yanagihara et al. | |
| 2014/0000970 A1* | 1/2014 | Munster | B25J 9/10 318/560 |
| 2014/0001993 A1* | 1/2014 | Iwata | B25J 9/08 310/68 B |
| 2015/0026985 A1 | 1/2015 | Yamaguchi et al. | |
| 2015/0034348 A1 | 2/2015 | Yoshida et al. | |
| 2015/0256111 A1 | 9/2015 | Forster et al. | |
| 2016/0200294 A1* | 7/2016 | Takeo | B23Q 5/56 74/411 |
| 2017/0314974 A1* | 11/2017 | Yokoyama | B25F 5/006 173/217 |
| 2017/0317554 A1* | 11/2017 | Yokoyama | B25B 23/147 81/479 |
| 2017/0343393 A1* | 11/2017 | Yokoyama | F16H 35/10 475/257 |

FOREIGN PATENT DOCUMENTS

| | | |
|---|---|---|
| JP | 59-086444 A | 5/1984 |
| JP | 2002-051589 A | 2/2002 |
| JP | 2007-275999 A | 10/2007 |
| JP | 2009-130966 A | 6/2009 |
| JP | 2012-196725 A | 10/2012 |
| JP | 2013-163229 A | 8/2013 |
| JP | 2013-193133 A | 9/2013 |
| WO | WO2009/151059 A | 12/2009 |
| WO | WO2013/136788 A1 | 9/2013 |

OTHER PUBLICATIONS

International Search Report for international application PCT/JP2016/055841 (dated Apr. 12, 2016), 10 pages with translation.
International Report on Patentability for application PCT/JP2016/055841 (dated Oct. 12, 2017), 9 pages.
China Patent Office office action for patent application CN201680010367.9 (dated Dec. 18, 2019), 23 pages with translation.

* cited by examiner

RIGHT ←→ LEFT

POWER TOOL HAVING FIRST ELASTIC MEMBER AND SECOND ELASTIC MEMBER ACCOMMODATED IN FIRST GEAR

TECHNICAL FIELD

The present invention relates to a power tool, and particularly to a power tool including a brushless motor.

BACKGROUND ART

Patent Document 1 describes a power tool equipped with a brushless motor. The brushless motor is provided with a smoothing capacitor having a small capacitance. The smoothing capacitor is disposed between a rectifier circuit that rectifies the AC voltage, and an inverter circuit.

CITATION LIST

Patent Literature

Patent Document 1: Japanese Patent No. 5633940

SUMMARY OF INVENTION

Technical Problem

Since the smoothing capacitor in the conventional power tool described above has a small capacitance, the smoothing capacitor can be kept small so as not to increase the size of the power tool. However, the voltage supplied to the brushless motor is a ripple voltage, which makes it difficult to rotate the saw blade or other end tool with stability.

It is an object of the present invention to provide a power tool capable of rotating an end tool with stability while avoiding an increase in the tool size.

Solution to Problem

In order to give a solution to the above technical problem, the invention provides a power tool including: a brushless motor including a rotor configured to rotate; a rectifier circuit configured to rectify an AC voltage; a smoothing capacitor configured to smooth the AC voltage rectified by the rectifier circuit to a pulsating voltage; an inverter circuit configured to perform switching operations to output the pulsating voltage to the brushless motor; a deceleration mechanism configured to decelerate a speed of a rotation of the rotor and configured to transmit the rotation to an end tool; and an elastic member disposed between a driving portion at a rotor side and a driven portion configured to transmit a rotating force to an end tool side. The elastic member is configured to transmit the rotating force of the driving portion to the driven portion.

According to the above configuration, the size of the power tool can be reduced since the smoothing capacitor has a small size and has a capacitance value so that the pulsating voltage is generated. The brushless motor drives with pulsations because the pulsating voltage is generated from the smoothing capacitor. The pulsation components are then absorbed by the elastic member, whereby the end tool rotates stably.

Preferably, an induced voltage is generated in the brushless motor upon rotations of the rotor. It is preferable that the smoothing capacitor has a capacitance value so that: the AC voltage rectified by the rectifier circuit is smoothed to the pulsating voltage having a minimum value less than the induced voltage, a current flows through the brushless motor for a period during which the pulsating voltage is greater than the induced voltage, and no current flows through the brushless motor for a period during which the pulsating voltage is less than or equal to the induced voltage.

According to the above configuration, the smoothing capacitor can have a small capacitance value so that: a current flows through the brushless motor for a period during which the pulsating voltage is greater than the induced voltage, and no current flows through the brushless motor for a period during which the pulsating voltage is less than or equal to the induced voltage. Accordingly, the small size of the smoothing capacitor and normal operation of the brushless motor can be realized.

Preferably, the driving portion has at least one gear; and the driven portion has a rotation shaft supporting the at least one gear.

According to the above configuration, the power tool having the reduction mechanism with simple configuration can be realized since the power tool has the reduction mechanism including the gear. In other words, the power tool can be a small-sized power tool.

Preferably, the deceleration mechanism includes: a pinion formed at an end portion of the rotor; the driving portion having a first gear in meshing engagement with the pinion; the driven portion having an intermediate shaft supporting the first gear; a second gear supported by the intermediate shaft and having a diameter smaller than that of the first gear; and a third gear in meshing engagement with the second gear.

Alternatively, the first gear has a diameter greater than that of the third gear; and the elastic member is configured to transmit the rotation of the first gear to the intermediate shaft is accommodated in the first gear.

According to the above configuration, the power tool can have a function to absorb the pulsation components without adding a structure except for the reduction mechanism since the reduction mechanism has the elastic member. Further, two stage reduction mechanism allows the power tool to obtain a predetermined reduction ratio without employing a large size gears. In other words, the power tool can be a small-sized power tool. With regard to a mobile circular saw, the final rotational shaft can be provided at the third gear having small size, and the protrusion amount of the end tool from the base can be therefore large, i.e. the cutting amount can be large.

Further, the elastic member is disposed to transmit the rotation of the first gear to the intermediate shaft, and the second and third gears are provided between the intermediate and final shafts. Accordingly, the elastic member prevents the mechanical pulsation generated by the brushless motor from being transmitted to the end tool, and reduces the gear noise caused by the pulsation. That is, pulsation of the first gear is absorbed before being transmitted to the second and third gears, whereby the power tool absorbs and reduces the pulsation effectively. Regarding the case where the elastic member is disposed in the second or third gear, the pinion and the first gear make gear noise therebetween due to the pulsation caused by the brushless motor. Further in the case, it is difficult for the elastic member to absorb the pulsation of the brushless motor, while the elastic member easily receives the reaction and vibrations applied to the end tool that is caused during the operation by the contact between a work piece and the end tool. The configuration absorbing the pulsation of the first gear before being transmitted to the second and third gears can reduce the gear noise generated between the pinion and the first gear.

Further, since the configuration consumes and converts the reaction and vibrations applied to the end tool into the gear noise that is caused during the operation by the contact between a work piece and the end tool, whereby the elastic member effectively absorbs the pulsation of the brushless motor.

Further, the configuration allows the power tool to employ the elastic member larger than that disposed in the second or third gear since the first gear having large diameter includes the elastic member. Accordingly, the pulsation can be absorbed effectively.

Preferably, the end tool is a circular saw blade configured to cut a workpiece by rotating in one direction.

According to the above configuration, the pulsation of the circular saw can be reduced, whereby the operation can be carried out without affecting the cutting surface of the workpiece.

Preferably, driving portion and the driven portion directly contact with each other in a rotating direction thereof when the elastic member deforms in predetermined amount.

According to the above configuration, the rotor is prevented from rotating by a lock lever or the like when the end tool is exchanged. In the case, a fastening member is detached from the final shaft by employing a wrench to rotate the fastening member, whereby the wrench applies large torque on the final gear. Because the driving and driven portions contact directly each other, the displacement of the driven portion relative to the driving portion is restricted to predetermined amount. Accordingly, the service life of the elastic member can be extended since application of a large load on the elastic member is prevented. Further, the application of a large load on the elastic member is also prevented when a large load is applied on the end tool in such cases where the end tool is broken and the end tool is unintentionally stuck in the workpiece during the operation.

Preferably, each of the driving portion and the driven portion has a plurality of contact portions disposed in the rotating direction, and the plurality of contact portions are positioned symmetrically with respect to a rotation shaft of the driven portion.

According to the above configuration, the contact portions contact each other in the positions symmetrical with respect to the rotation shaft. As a result, the phenomenon that the rotational shaft and the rotation axis displace with respect to each other is deterred. Accordingly, the gaps between gears are hindered from being larger, thereby avoiding generating noise or frictional wear of the gears.

Preferably, the elastic member is positioned between the plurality of contact portions; and the elastic member is configured to deform in the rotating direction of the driving portion and the driven portion and further configured to deform in a radial direction of the driving portion and the driven portion, so that the elastic member restricts a displacement between a rotation axis of the driving portion and the rotation shaft of the driven portion.

According to the above configuration, the phenomenon that the rotational shaft and the rotation axis displace with respect to each other is deterred. Accordingly, occurrence of the noise or frictional wear of the gears is restricted.

Preferably, the power tool includes a detection portion configured to detect a rotation state of the brushless motor; and a control unit configured to detect a rotation speed of the brushless motor based on a detection result of the detection portion, and configured to control the switching operations of the inverter circuit based on the detected rotation speed. The control unit is configured to perform a constant-speed control where the rotation speed of the brushless motor is maintained constant until a load applied to the end tool reaches a predetermined load; and the elastic member has a degree of hardness so that the elastic member is deformable in a condition where the load less than the predetermined load is applied to the end tool.

Preferably, the elastic member is configured to allow the plurality of the contact portions to contact with each other when the load greater than the predetermined load is applied to the end tool.

According to the above configuration, operability of the power tool is increased since the elastic member absorbs in a target rotational speed period. Here, the target rotational speed period is the period where the brushless motor can achieve a predetermined rotational speed by performing constant speed control. If the hardness of the elastic member is large, the elastic member cannot absorb the pulsation. On the contrary, the operability is maintained by setting proper hardness of the elastic member in the target rotational speed period in which the applied load is small.

Preferably, a current detection portion is configured to detect a current flowing through the brushless motor; and a control unit is configured to control the switching operation of the inverter circuit. The control unit is configured to perform a stop control to stop the brushless motor when it is determined that the current detected by the current detection portion is greater than or equal to a predetermined current, and the degree of hardness of the elastic member is set such that the plurality of contact portions contact with each other when the current greater than the predetermined current is applied to the brushless motor.

According to the above configuration, the operability is increased since the elastic member continuously absorbs the pulsation in the period where the brushless motor drives.

Preferably, the power tool includes a current detection portion configured to detect a current flowing through the brushless motor, and a control unit configured to control the switching operation of the inverter circuit. The control unit is configured to perform a stop control to stop the brushless motor when it is determined that the current detected by the current detection portion is greater than or equal to a predetermined current, the degree of hardness of the elastic member is set such that the plurality of contact portions contact with each other when the current slightly less than the predetermined current is applied to the brushless motor.

According to the above configuration, the contact portions contact with each other before the motor is halted to protect the motor from overcurrent, and the absorption of the pulsation by the element member is therefore interrupted. As a result, the operator can feel the pulsation and can sense that the motor will be halted by the overcurrent protection if the load is increased further. This has the effect of encouraging the operator to lighten the force with which the circular saw is pressed against the workpiece in order to avoid the occurrence of overcurrent.

Preferably, the brushless motor is an inner rotor type brushless motor including a stator positioned radially outside of the rotor.

According to the above configuration, by adopting an inner rotor brushless motor, the brushless motor can be a small motor that is smaller than an outer rotor brushless motor. Since the inertia of the rotor (moment of inertia) is small and, hence, the inputted ripple voltage is more likely to affect the rotor. However, the mechanical pulsations can be absorbed by disposing the elastic member so that the power tool can be operated without affected by the pulsation.

Advantageous Effects of Invention

According to the power tool of the invention can reduce the size thereof and can rotate the end tool stably.

DESCRIPTION OF EMBODIMENTS

First Embodiment

Figure 1:
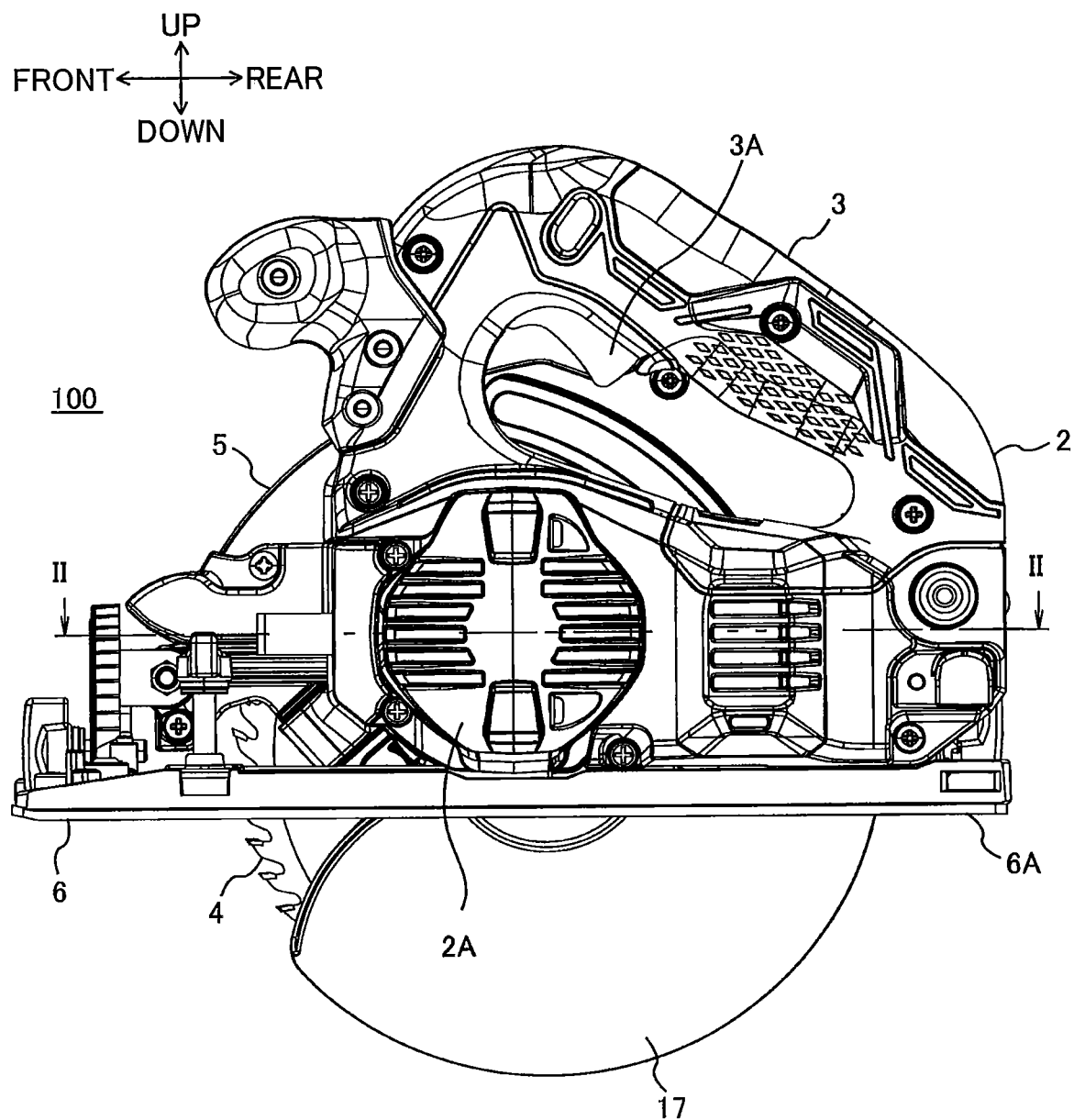
FIG. 1 is a side view of a circular saw according to a first embodiment of the invention.

A circular saw 100 according to a first embodiment of the present invention will be described while referring to the accompanying drawings. In FIG. 1, left in the drawing is defined as the forward direction, right as the rearward direction, up as the upward direction, and down as the downward direction. The rightward and leftward directions are defined as directions toward the right and left, respectively, when viewing the circular saw 100 along the rearward direction (i.e., the near side in FIG. 1 is the leftward direction, and the opposite side is the rightward direction). Further, identical or equivalent components, members, steps, and the like illustrated in the drawings will be designated with the same reference numerals, and duplicative descriptions will be omitted as appropriate. In addition, the embodiments are not intended to limit the scope of the present invention, but exemplify the invention. All of the features and the combinations thereof described in the embodiments are not necessarily essential to the invention.

Figure 2:
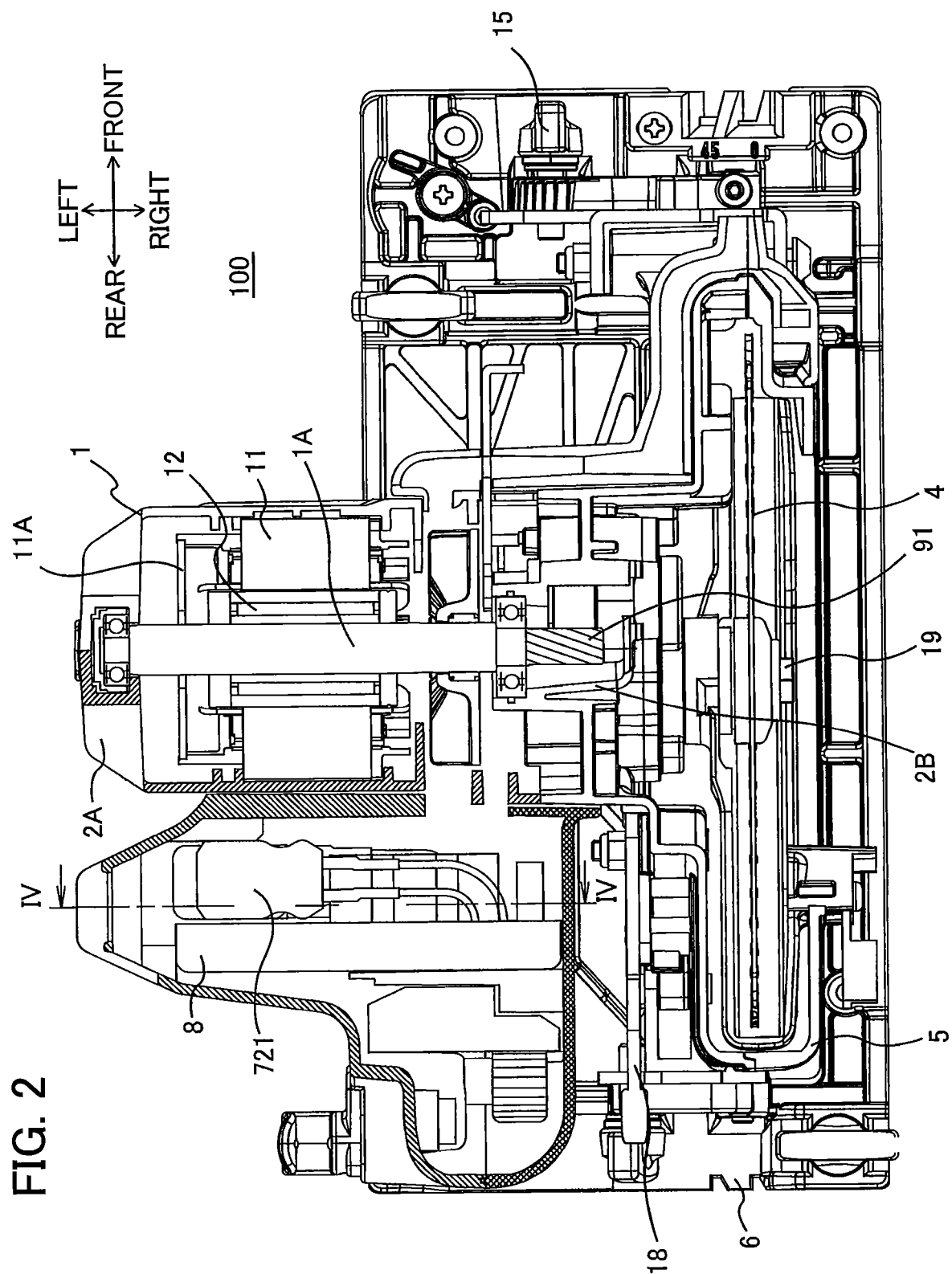
FIG. 2 is a cross-sectional view taken along a II-II line of FIG. 1.

As shown in FIGS. 1 and 2, the circular saw 100 primarily includes a housing 2, a handle 3, a saw blade 4, a blade cover 5, and a base 6. The housing 2 accommodates a motor 1, and a control board 8. The handle 3 is provided integrally with the housing 2, or is a separate member that is coupled with the housing 2. The handle 3 has a trigger 3A shown in FIG. 4 that controls the drive of the motor 1. The saw blade 4 is driven to rotate by the motor 1. The blade cover 5 is mounted on the housing 2. The blade cover 5 has a shape for covering the approximate upper half of the circumference of the saw blade 4. The blade cover 5 houses part of the circumference of the saw blade 4 and part of the side surface of the motor 1. The base 6 is coupled to the housing 2 via the blade cover 5.

The housing 2 has a motor housing 2A and a gear cover 2B that are integrally assembled together. The motor housing 2A has a cylindrical shape with a closed end and covers the motor 1. A bearing is retained in the closed end of the motor housing 2A for supporting one end of a rotational shaft in the motor 1. The gear cover 2B is formed of aluminum or another metal. The gear cover 2B supports a deceleration mechanism 9 that decelerates the rotational speed of an output shaft 1A, and covers the top half of the saw blade.

As shown in FIG. 2, the motor 1 is a three-phase brushless DC motor provided with a stator 11, a rotor 12, and the output shaft 1A. The output shaft 1A is rotatably supported in the housing 2 so as to be oriented in the left-right direction. Further, the output shaft 1A is connected to the saw blade 4 through the deceleration mechanism 9. The saw blade 4 rotates by the rotational drive of the output shaft 1A. The rotor 12 includes two pairs of permanent magnets, each pair having an N pole and an S pole, and is configured to surround the outer circumference of the output shaft 1A. The stator 11 is configured with three phase windings U, V, and W that are star-connected. The windings U, V, and W are connected to the control board 8.

The stator 11 is arranged so as to surround the outer circumference of the rotor 12. In other words, the motor 1 is an inner rotor brushless motor. Hall effect sensors 11A are arranged on the left end of the output shaft 1A at positions confronting the permanent magnets. The Hall effect sensors 11A output position signals of the output shaft 1A to the control board 8. The Hall effect sensors 11A correspond to the detection portion of the invention.

The blade cover 5 is coupled to the base 6 so as to enclose the saw blade 4 in the vicinity of the both longitudinal ends of the base 6. The blade cover 5 is provided with a lever 18 and a knob 15, and includes a mechanism that adjusts the amount that the saw blade 4 protrudes from the bottom surface of the base 6 when the lever 18 is operated, and a mechanism that tilts the rotational plane of the saw blade 4 relative to the base 6 (i.e., tilts the housing 2 relative to the base 6) when the knob 15 is operated.

The base 6 is connected to the bottom of the housing 2. The base 6 is configured of a plate having a general rectangular shape. The base 6 has a bottom surface 6A that can slide over a workpiece, such as lumber, and an open area through which the saw blade 4 can protrude below the bottom surface 6A. The open area is arranged such that its longitudinal direction matches the cutting direction of the saw blade 4.

The circular saw 100 is provided with a safety cover 17 that is shaped to cover approximately half the circumference of the saw blade 4. The safety cover 17 is retained in the blade cover 5 and can rotate coaxially with the saw blade 4. The safety cover 17 can be accommodated in the blade cover 5. A spring or other urging means not shown in the drawings urges the safety cover 17 toward an initial state. The initial state is the rotated position of the safety cover 17 in which the most part of the safety cover 17 projects below the bottom surface 6A of the base 6 to avoid exposing the outer circumferential edge of the saw blade 4. During a cutting operation, the forward-facing edge of the safety cover 17 relative to the cutting direction (the left edge in FIG. 1) contacts the edge of the workpiece. In this state, when the circular saw slides in the cutting direction, the safety cover 17 rotates against the spring and retracts into the blade cover 5, thereby exposing the saw blade 4 below the bottom surface 6A of the base 6.

Figure 3:
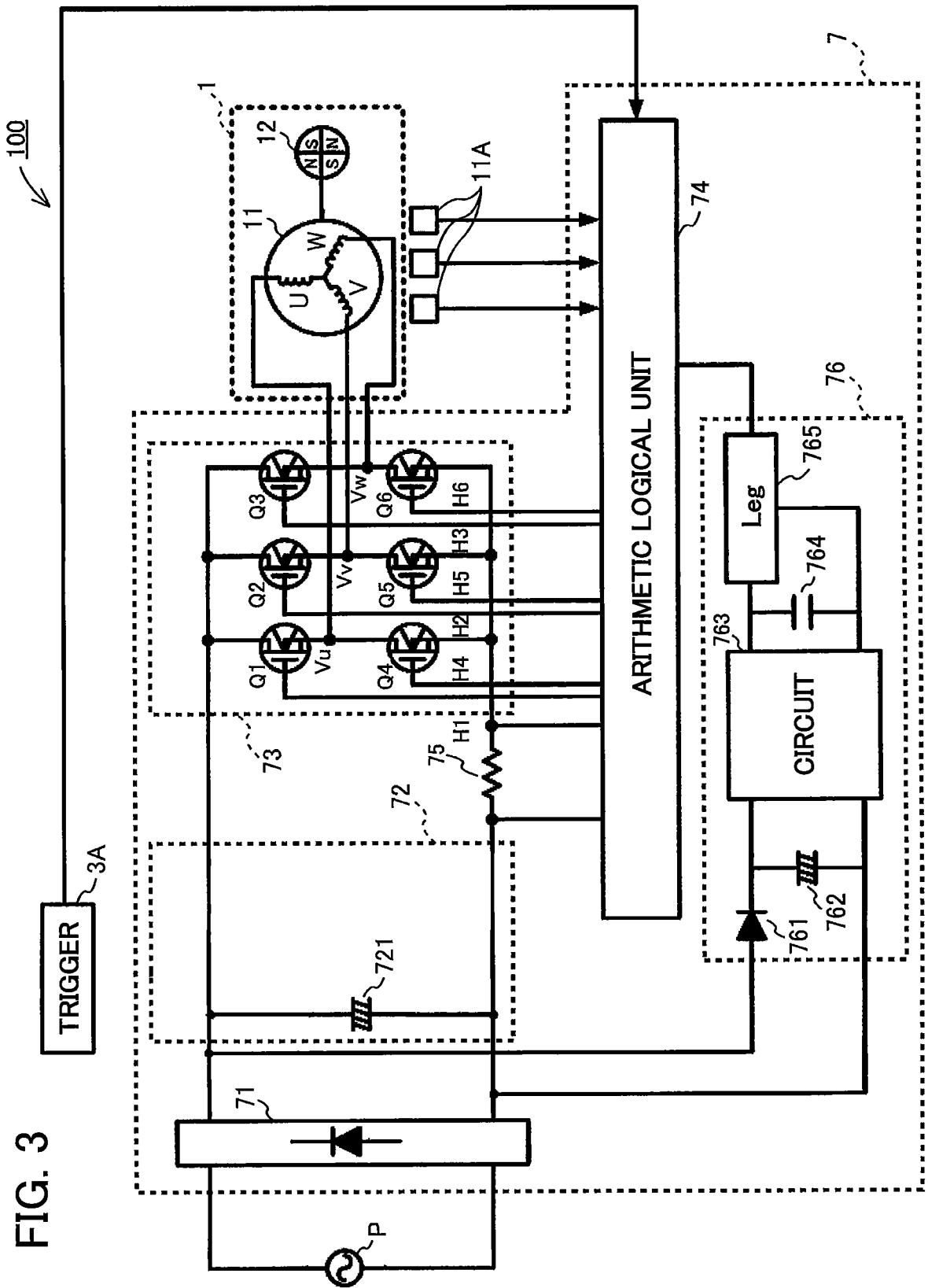
FIG. 3 is a circuit diagram indicating an electric configuration of the circular saw according to the first embodiment of the invention.

Next, the circuit configuration of the circular saw 100 according to the first embodiment will be described. FIG. 3 is a circuit diagram showing the electrical structure of the circular saw 100 according to the first embodiment. As shown in FIG. 3, the circular saw 100 includes the motor 1, the trigger 3a, and a control unit 7.

As shown in FIG. 3, the control unit 7 includes a rectifier circuit 71, a smoothing circuit 72, an inverter circuit 73, an arithmetic logical unit 74, a current detecting resistor 75, and a constant-voltage power supply circuit 76. Of these, the rectifier circuit 71, inverter circuit 73, arithmetic logical unit 74, and constant-voltage power supply circuit 76 are mounted on the control board 8. The current detecting resistor 75 corresponds to the current detecting portion in the invention.

Figure 4:
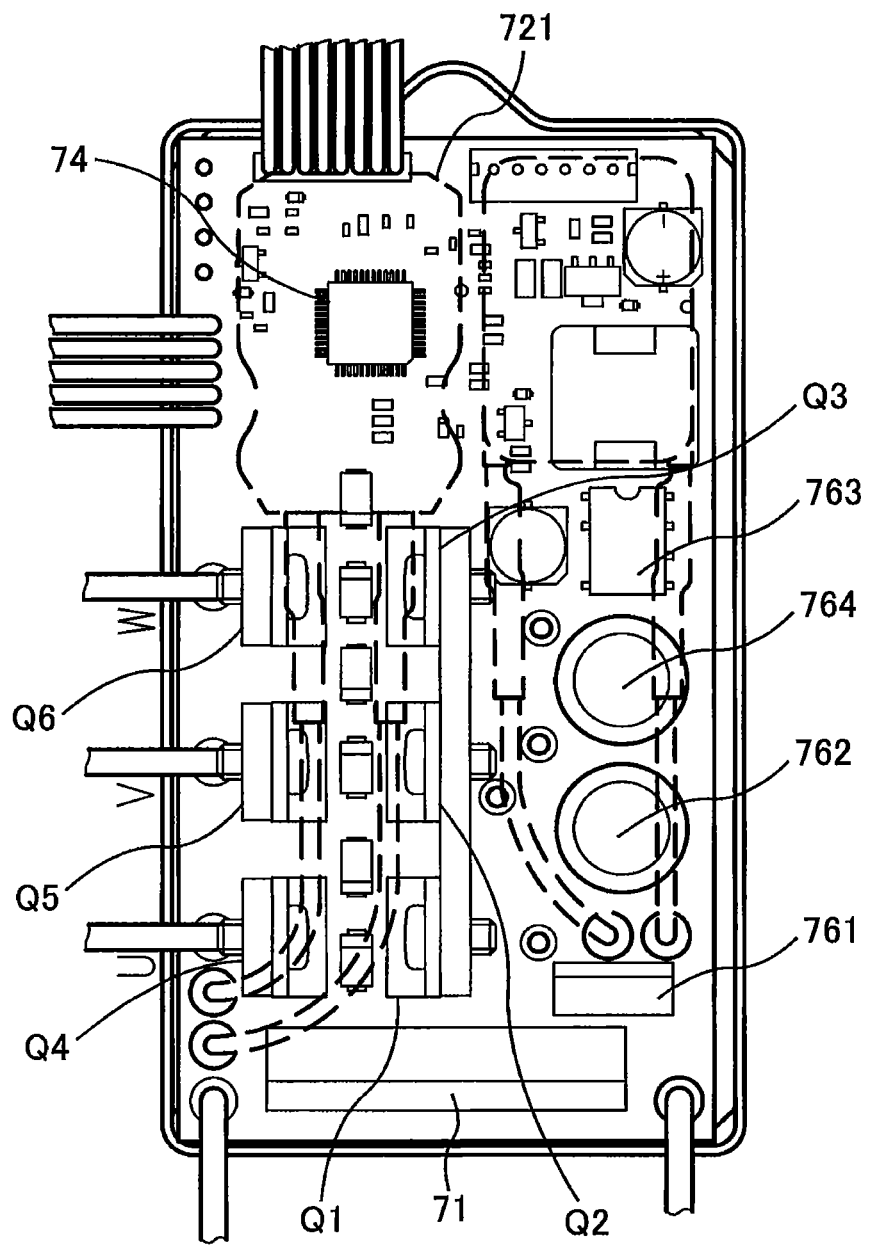
FIG. 4 is a cross-sectional view taken along a IV-IV line of FIG. 2 indicating a control board.

The rectifier circuit 71 is a diode bridge circuit. As shown in FIG. 3, the input side of the rectifier circuit 71 is connected to a commercial AC power supply P, for example, while the output side is connected to the smoothing circuit 72. The rectifier circuit 71 performs full-wave rectification of the AC voltage inputted from the commercial AC power supply P and outputs the rectified voltage to the smoothing circuit 72. As shown in FIG. 4, the rectifier circuit 71 is mounted on the control board 8.

As shown in FIG. 3, the smoothing circuit 72 is disposed between the rectifier circuit 71 and inverter circuit 73. The smoothing circuit 72 smooths voltage inputted from the rectifier circuit 71 and outputs the resulting voltage to the inverter circuit 73. In the preferred embodiment, the smoothing circuit 72 includes a smoothing capacitor 721.

The electrolytic capacitor 721 is a polarized capacitor. As shown in FIG. 3, the electrolytic capacitor 721 is connected to the rectifier circuit 71. As shown in FIG. 2, the electrolytic capacitor 721 is disposed in the space between the control board 8 and the motor 1 and is connected to the control board 8.

The inverter circuit 73 includes six switching elements Q1-Q6 connected in a three-phase bridge circuit. Here, the switching elements Q1-Q6 may be MOSFETs (metal oxide semiconductor field effect transistors) or IGBTs (insulated gate bipolar transistors), for example. As shown in FIG. 4, the switching elements Q1-Q6 are mounted on the control board 8. As shown in FIG. 3, the inverter circuit 73 is connected to the output side of the smoothing circuit 72. Power for driving the motor 1 is supplied to the windings U, V, and W through switching operations performed on the switching elements Q1-Q6.

In the preferred embodiment, the arithmetic logical unit 74 is a microcomputer. As shown in FIG. 4, the arithmetic logical unit 74 is mounted on the control board 8. The arithmetic logical unit 74 controls the direction and duration at which electricity is conducted to the windings U, V, and W in order to control the rotational speed and direction of the motor 1. The arithmetic logical unit 74 is connected to each gate of the six switching elements Q1-Q6 in the inverter circuit 73 and supplies drive signals H1-H6 for switching the switching elements Q1-Q6 on and off.

Here, the drain or source of each of the switching elements Q1-Q6 in the inverter circuit 73 is connected to one of the windings U, V, and W in the motor 1. The switching elements Q1-Q6 execute switching operations based on the drive signals H1-H6 inputted from the arithmetic logical unit 74 to relay voltage supplied from the commercial AC power supply P to the windings U, V, and W of the motor 1 via the rectifier circuit 71 and smoothing circuit 72 as drive voltages Vu, Vv, and Vw in three phases (U phase, V phase, and W phase).

The current detecting resistor 75 is a resistor that detects current flowing to the motor 1. As shown in FIG. 3, the current detecting resistor 75 is connected between the smoothing circuit 72 and inverter circuit 73.

As shown in FIG. 3, the constant-voltage power supply circuit 76 is connected to the output side of the rectifier circuit 71. The constant-voltage power supply circuit 76 includes a diode 761, a capacitor 762, an IPD circuit 763, a capacitor 764, and a regulator 765. The constant-voltage power supply circuit 76 serves to supply a stable reference voltage to the arithmetic logical unit 74 and the like based on output from the rectifier circuit 71. The components of the constant-voltage power supply circuit 76 are mounted on the control board 8, as illustrated in FIG. 4.

The component used as the smoothing capacitor 721 has a small capacitance. When using a component with a small capacitance, the AC voltage outputted from the smoothing circuit 72 is not completely smoothed, but rather a ripple voltage is outputted from the smoothing capacitor 721. In the preferred embodiment, the smoothing capacitor 721 has a capacitance for smoothing AC voltage outputted from the smoothing circuit 72 to a ripple waveform having a minimum value smaller than the induced voltage generated in the motor 1.

Figure 5:
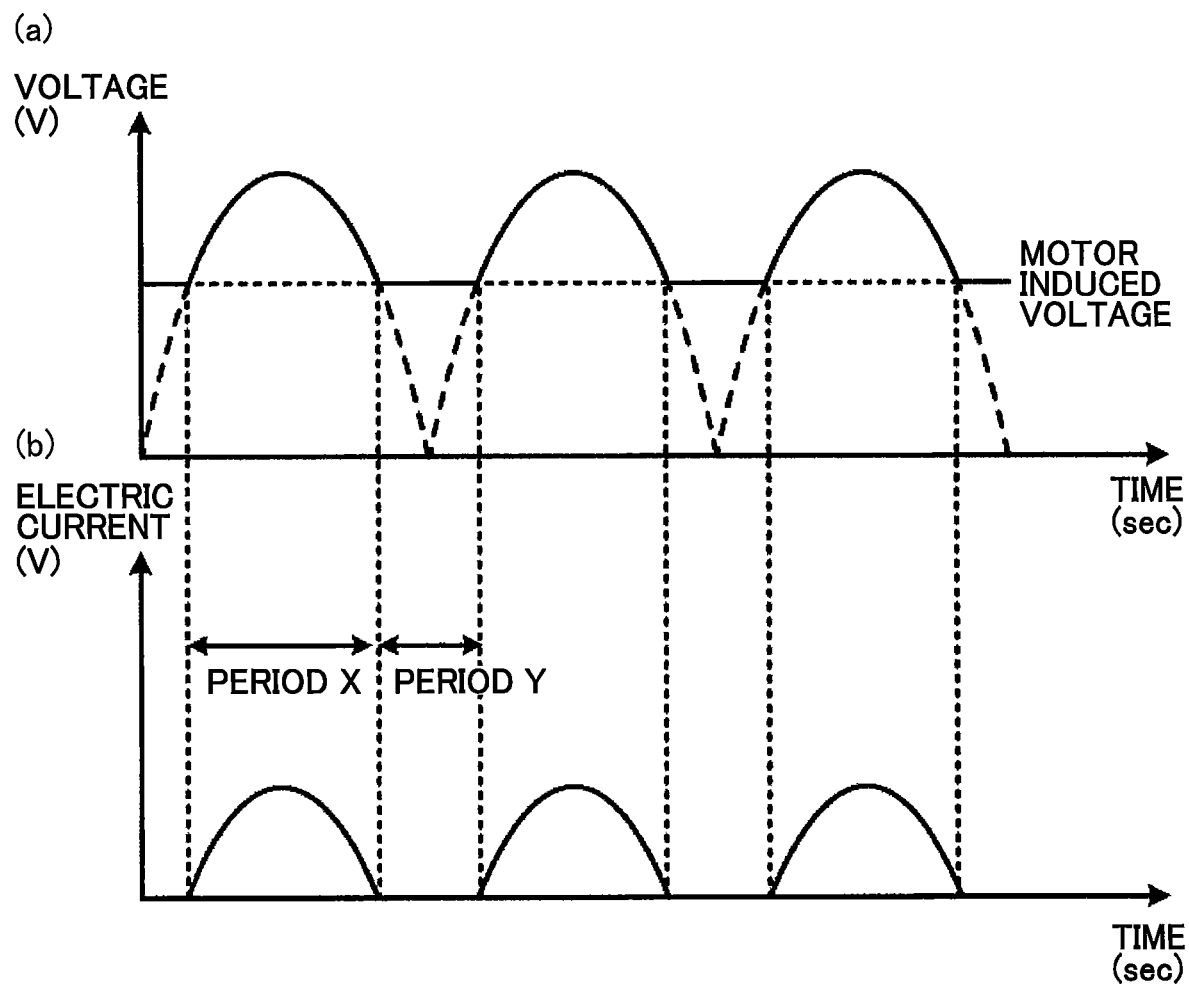
FIG. 5 indicates (a) a graph illustrating relationship between time and an voltage outputted from a smoothing capacitor in a normal operation and (b) a graph illustrating relationship between time and current through a motor.

In order to drive the motor 1, the supplied voltage must be greater than the induced voltage generated by the motor 1. If a ripple voltage is supplied to the motor 1, the motor 1 is not driven if the magnitude of the ripple voltage is less than the induced voltage. Hence, current flows in the motor 1 during periods X in which the magnitude of the ripple voltage is greater than or equal to the induced voltage, as illustrated in the part (a) of FIG. 5, but does not flow in the motor 1 during periods Y in which the magnitude of the ripple voltage is less than the induced voltage, as illustrated in the part (b) of FIG. 5. However, the motor 1 rotates by inertia in the periods Y since the motor 1 is driven in the periods X, enabling the motor 1 to rotate continuously, provided that the motor 1 is driven periodically in the periods X. Hence, the circular saw 100 according to the embodiment can employ a smoothing capacitor 721 with a capacitance capable of outputting a ripple waveform having a minimum value smaller than the induced voltage generated in the motor 1.

Figure 6:
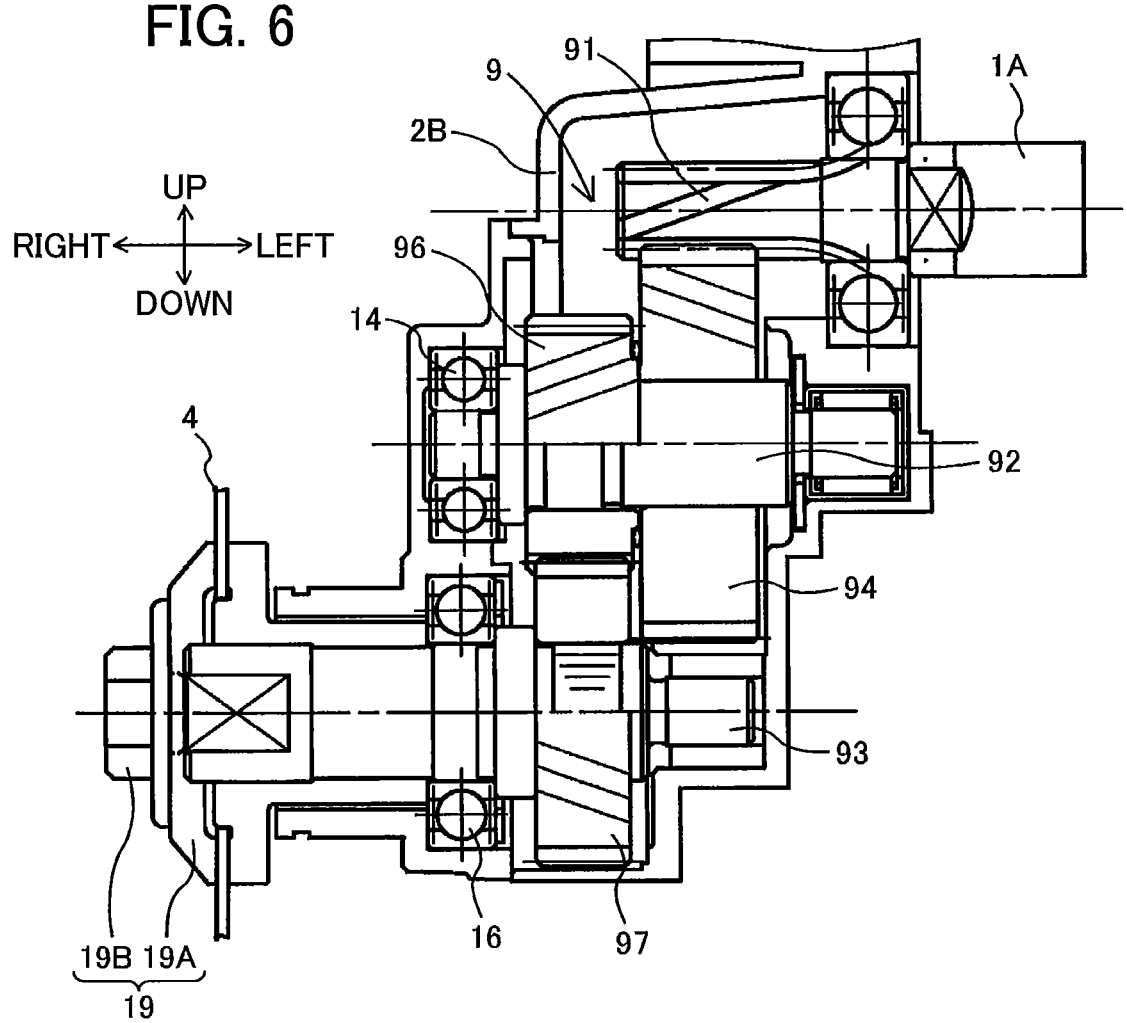
FIG. 6 is a side view, part of which indicates a cross-section, of a reduction mechanism in the circular saw according to the first embodiment of the invention.

Next, the deceleration mechanism 9 will be described with reference to FIG. 6. The deceleration mechanism 9 is a two-stage reduction mechanism accommodated in the gear cover 2B. The rotational speed of the motor is reduced by the deceleration mechanism 9 when being transmitted to the saw blade. The deceleration mechanism 9 primarily includes a pinion 91, an intermediate shaft 92, a final shaft 93, a first gear 94, a second gear 96, and a third gear 97. The intermediate shaft 92 and final shaft 93 are arranged with their axes oriented in the left-right direction. The intermediate shaft 92 and final shaft 93 are rotatably supported in the housing 2 or gear cover 2B through bearings 14 and 16, respectively.

The pinion 91 is a helical gear that is connected coaxially with the right end of the output shaft 1A. The pinion 91 functions to transmit the rotation of the output shaft 1A to the first gear 94.

The first gear 94 is a helical gear disposed below the pinion 91. The first gear 94 is supported on the intermediate shaft 92 and meshes with the pinion 91. The first gear 94 functions to transmit a drive force from the pinion 91 to the intermediate shaft 92.

The second gear 96 is a helical gear disposed to the right side of the first gear and is supported by the intermediate shaft 92. The second gear 96 rotates together with the intermediate shaft 92 and functions to transmit a drive force to the third gear 97. The second gear 96 has a smaller diameter than the first gear 94.

The third gear 97 is a helical gear that is disposed beneath the second gear. The third gear 97 is supported by the final shaft 93 and meshes with the second gear. The third gear 97 functions to transmit a drive force from the second gear to the final shaft 93 that rotates together with the third gear. The third gear 97 has a larger diameter than the second gear 96 and a smaller diameter than that of the first gear 94. Since the second gear 96 has a smaller diameter than that of the first gear 94, the third gear 97 rotates at a slower speed than the first gear 94. In other words, the third gear 97 receives a drive force from the first gear 94 that has been reduced through the second gear 96.

The final shaft 93 functions to transmit a drive force to the saw blade 4. Specifically, the final shaft 93 is configured such that a fixing member 19 can be connected to the right end thereof. The fixing member 19 is configured of a fixture 19A, and a screw 19B. The saw blade 4 is fixed to the right end of the final shaft 93 by fixing the center portion of the saw blade 4 in the fixture 19A and screwing the screw 19B into the end portion of the final shaft 93 with the fixture 19A interposed therebetween. When the circular saw 100 is operated, the saw blade 4 receives the drive force of the motor 1 and rotates together with the final shaft 93.

Figure 7A:
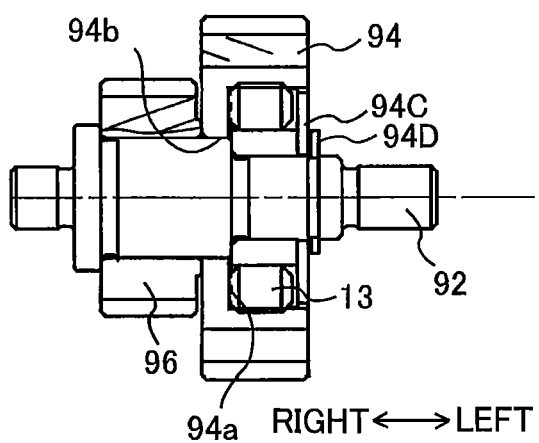
FIG. 7A is a side view, part of which indicates a cross-section, of a first gear in the circular saw according to the first embodiment of the invention.
Figure 7B:
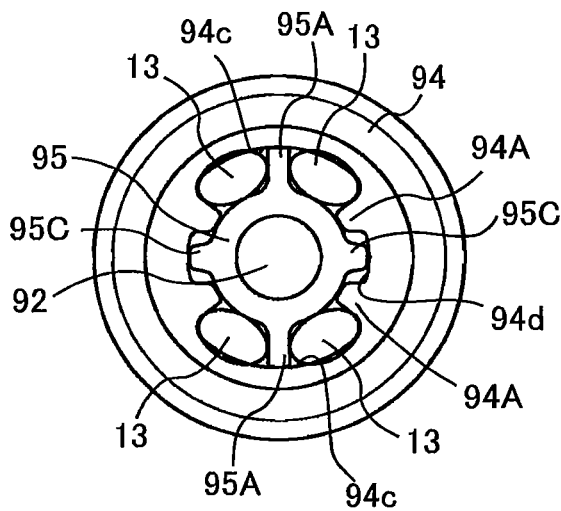
FIG. 7B is a left side view thereof.

FIG. 7 shows the first gear 94 and intermediate shaft 92. An encapsulating area 94a is formed in the first gear 94 by drilling the side surface of the first gear 94 along the axial direction of the same. A hole 94b is drilled through the inside of the encapsulating area 94a. As shown in FIG. 7(b), protruding parts 94A are formed on the first gear 94 so as to protrude inward along radial directions of the first gear 94. The protruding parts 94A are provided at four positions that are symmetrical with respect of the center axis of the first gear 94. As shown in FIG. 7(b), gaps 94c and 94d defined between the protruding parts 94A are arranged at positions substantially orthogonal to each other. The intermediate shaft 92 is inserted into the hole 94b so as to be loosely fitted in the first gear 94. The encapsulating area 94a is formed point-symmetrically relative to the central axis of rotation for the first gear 94 in a plane to which the central axis of rotation is a normal. In the preferred embodiment, the first gear 94 is an example of the drive portion in the present invention, and the intermediate shaft 92 is an example of the driven portion.

A coupling 95 is fitted into the encapsulating area 94a so as to be incapable of rotating relative to the intermediate shaft 92. The coupling 95 is provided with a pair of wall portions 95A disposed on opposite sides from each other in the diametrical direction of the coupling 95, and a pair of protruding parts 95C provided at positions substantially orthogonal to the wall portions 95A. The protruding parts 95C are positioned within the gaps 94d between protruding parts 94A. Since the protruding parts 95C and protruding parts 94A are arranged in positions allowing contact between the same, each protruding part 95C can only move between the corresponding protruding parts 94A so that the coupling 95 on which the protruding parts 95C are provided can only rotate within this range. The wall portions 95A are arranged in the gaps 94c between pairs of the protruding parts 94A. Further, the intermediate shaft 92 and coupling 95 are formed point-symmetrically relative to the axial center of the intermediate shaft 92. Here, the protruding parts 94A or protruding parts 95C correspond to the contact parts of the invention.

As shown in FIG. 7(a), the first gear 94 is interposed between the intermediate shaft 92 and coupling 95 at a proximal position of the intermediate shaft 92. Note that the coupling 95 is press-fitted on the intermediate shaft 92 during manufacturing so as to be tightly fitted thereon, but is not press-fitted to a position that fixes the first gear 94. Therefore, the first gear 94 and intermediate shaft 92 can rotate relative to each other.

As shown in FIG. 7(b), elastic members 13 are disposed in the gaps 94c partitioned by the protruding parts 94A. The elastic members 13 are formed of a heat-resistant and oil-resistant rubber. Further, the elastic members 13 are all formed in substantially the same shape and are retained between the coupling 95 and first gear 94 in a compressed state so as to confront protruding parts 94A and wall portions 95A while also contacting the outer circumferential surface of the coupling 95. These elastic members 13 form a substantially elliptical shape in cross section, with one surface forming the elliptical shape confronting a protruding part 94A and the other surface forming the elliptical shape confronting a wall portion 95A. Since each wall portion 95A is interposed between two elastic members 13 in the corresponding gap 94c, the wall portion 95A is positioned in the approximate center of the gap 94c during a period of nonoperation. The protruding parts 95C provided at positions approximately orthogonal to the wall portions 95A are positioned in the approximate centers of the gaps 94d, as illustrated in FIG. 7(b). Thus, gaps are formed between protruding parts 95C and protruding parts 94A so that the protruding parts 95C do not contact the protruding parts 94A during a period of nonoperation.

A cover 94C is loosely fitted over the intermediate shaft 92. A C-ring 94D is assembled on the intermediate shaft 92 on left of the cover 94C for clamping the cover 94C against the first gear 94. The cover 94C and C-ring 94D are assembled for retaining the elastic members 13 in the encapsulating area 94a. The cover 94C is loosely fitted on the intermediate shaft 92 in order to cover the side surface of the first gear 94 once the elastic members 13 have been disposed. The cover 94C holds the elastic members 13 in their arranged positions. With this configuration, the intermediate shaft 92 and first gear 94 can rotate together through the coupling 95 and elastic members 13.

The elastic members 13 are preferably formed of rubber with a relatively high hardness and good wear-resistance and are selected to be suitable for the motor specifications, end tool size, and the like. However, the elastic members 13 are preferably formed of a material such as urethane rubber, nitrile rubber, or styrene rubber, with a JIS type-A hardness (JIS K6301) of approximately Hs 70-95.

Figure 8:
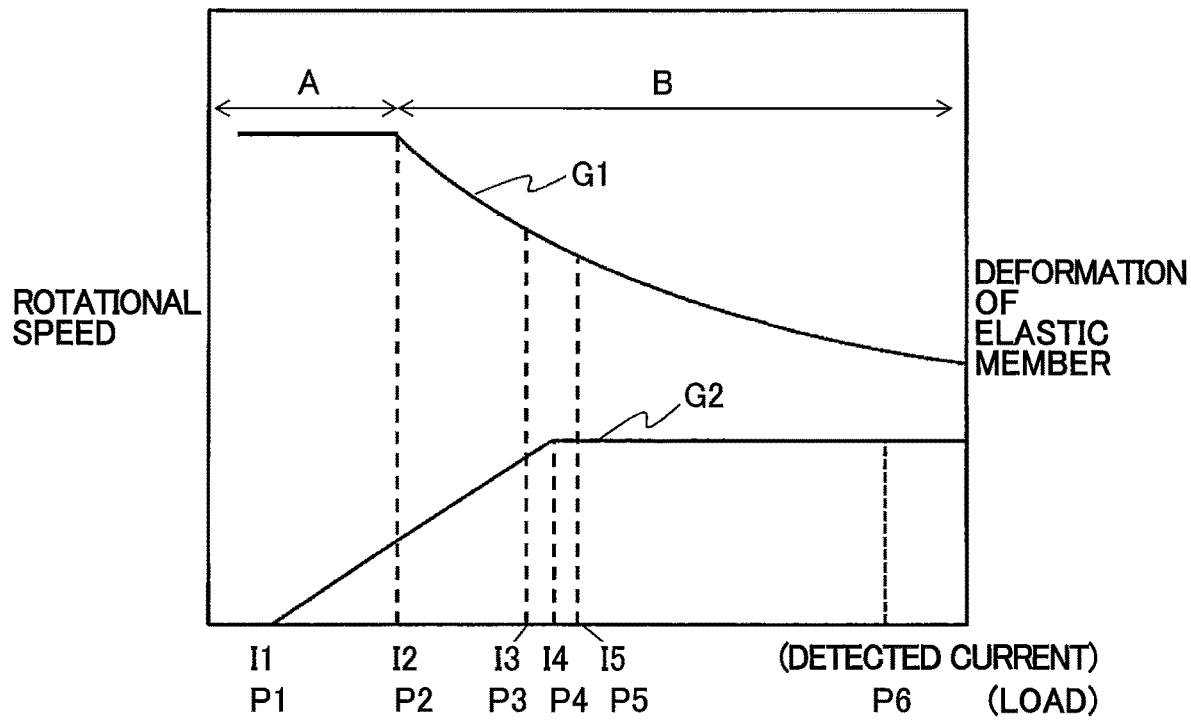
FIG. 8 is a graph illustrating a rotational speed and deformation of an elastic member with respect to a load or detected current.

Specifically, the hardness of the elastic members 13 when formed of rubber is set based on either the electric current flowing through the circuit or the load on the elastic members 13, as illustrated in FIG. 8. The horizontal axis in FIG. 8 represents the current detected by the current detecting resistor 75 (detected current). Graph line G1 shows the relationship between the detected current and the average rotational speed of the saw blade 4 per unit time. Graph line G2 shows the relationship between the detected current and the deformation amount of the elastic members 13. Further, currents I1, I2, I3, I4, and I5 and loads P1, P2, P3, P4, P5, and P6 corresponding to these currents are defined as threshold values specifying key points and prescribed periods of current control.

Graph line G1 is configured of two periods including a target rotational speed period A and a fixed duty cycle period B. Current I2 (load P2) marks the division between these periods. During the target rotational speed period A, the control unit 7 performs constant speed control, increasing the current by setting the duty cycle according to the load applied to the saw blade 4 and maintaining a prescribed rotational speed. That is, the control unit 7 controls switching operations of the inverter circuit 73 based on the rotational speed of the output shaft 1A detected by the Hall effect sensors 11A, thereby maintaining the output shaft 1A at the prescribed rotational speed. When the magnitude of the detected current exceeds current I2, the duty cycle has reached its upper limit. In other words, in the fixed duty cycle period B the duty cycle is fixed at the upper limit. Consequently, the rotational speed of the saw blade 4 gradually decreases in response to an increase in load during the fixed duty cycle period B, and the detected current gradually increases.

As indicated by graph line G2, the elastic members 13 deform when the detected current exceeds current I1 in the target rotational speed period A, i.e., when the load is at least load P1. The deformation amount of the elastic members 13 in the target rotational speed period A gradually increases in response to a rise in detected current or load. When the magnitude of the detected current exceeds current I4 (load P4), the deformation amount of the elastic members 13 stays constant owing to the protruding parts 95C contacting the protruding parts 94A.

Here, the control unit 7 performs control to halt the motor 1 upon determining that the detected current is greater than or equal to a prescribed current in order to protect the motor 1 and inverter circuit 73 from overcurrent. The following are two types of specific control methods.

In the first control method, the control unit 7 halts the motor 1 when a current greater than or equal to current I3 (load P3) has been detected. Here, current I3 is smaller than current I4, as illustrated in FIG. 8. In the second control method, the control unit 7 halts the motor 1 when a current greater than or equal to current I5 (load P5) has been detected. As shown in FIG. 8, current I5 is slightly larger than current I4.

In other words, the hardness of the elastic members 13 described above is set as follows. As shown in FIG. 8, the elastic members 13 possess a hardness that allows them to deform while a load smaller than load P4 is exerted on the saw blade 4 until the protruding parts 95C and protruding parts 94A contact each other when a load greater than load P4 is exerted on the saw blade 4. Further, when employing the first control method, the elastic members 13 possess a hardness whereby the protruding parts 95C and protruding parts 94A contact each other when the detected current reaches current I4, which is larger than current I3, as illustrated in FIG. 8. Alternatively, if the second control method is employed, the elastic members 13 possess a hardness that allows the protruding parts 95C and protruding parts 94A to contact each other when the detected current reaches current I4, which is slightly smaller than current I5.

Next, operations of the circular saw 100 will be described. The motor 1 is driven to rotate when the operator operates the trigger 3A on the circular saw 100. The drive force from this rotation is transmitted to the pinion 91 and first gear 94, ultimately driving the saw blade 4 fixed to the final shaft 93.

The motor 1 operates on a ripple voltage that has been smoothed by the smoothing capacitor 20B having a small capacitance. As a result, the output shaft 1A and pinion 91 rotate at a speed that varies in short periods, causing the output shaft 1A and pinion 91 to rotate with mechanical pulsations.

Consequently, the first gear 94 receiving a drive force from the pinion 91 also rotates with pulsations. Since the elastic members 13 interposed between the coupling 95 and first gear 94 absorb these pulsations, the pulsations are not likely to be transmitted to the coupling 95, second gear 96, final shaft 93, and the like, allowing the final shaft 93 on which the saw blade 4 is fixed to rotate steadily. Hence, this configuration can suppress the generation of pulsations, vibrations, and noise in the saw blade 4. Further, a cutting operation can be performed without affecting the smoothness of the cut surface in the workpiece. Hence, this construction not only allows for a reduction in capacitance and size of the smoothing capacitor, but also achieves normal operations of the brushless motor.

Further, since the saw blade 4 is halted at the beginning of an operation, the final shaft 93 to which the saw blade 4 is fixed and the coupling 95 that is press-fitted on the final shaft 93 are urged to stop in the same position by inertia and rotate relative to the first gear 94. However, the wall portions 95A provided on the coupling 95 and the protruding parts 94A contact each other through the elastic members 13, thereby compressing the elastic members 13. As a result, the coupling 95 and first gear 94 are prevented from contacting each other and rotate smoothly with low noise.

When the circular saw 100 begins cutting a board or other workpiece while the saw blade 4 is rotating, a load is applied to the saw blade 4. The amount of load is determined by the material, thickness, and the like of the workpiece. However, this load is not necessarily the same throughout the entire workpiece, but may vary according to the cutting point. The intermediate shaft 92 and coupling 95 are compelled to rotate relative to the first gear 94 due to such variations in load, but forces generated by these rotations are absorbed by the elastic members 13 between the coupling 95 and first gear 94. Accordingly, the first gear 94 is unlikely to be affected by these variations in load. In this way, it is possible to suppress rattling between gear teeth and noise, deformation, and the like caused by such rattling.

When stopping the circular saw 100, the operator releases the trigger 3A to halt operations, and an electromagnetic brake is applied to the motor 1. This electromagnetic brake generates load on the rotation of the pinion 91 and also rapidly halts rotation of the first gear 94. However, the intermediate shaft 92 and coupling 95 rotate relative to the first gear 94 due to the inertial force of the saw blade 4. At this time, the wall portions 95A provided on the coupling 95 contact the protruding parts 94A via the elastic members 13, causing the elastic members 13 to compress. Through the elastic members 13, the coupling 95 and first gear 94 are prevented from contacting each other and can be halted without the occurrence of impacts and the like.

In particular, although it is desirable to operate the circular saw 100 once the motor 1 has attained the target rotational speed, the elastic members 13 can improve operability by absorbing pulsations in the target rotational speed period A, as shown in FIG. 8. Elastic members 13 whose hardness is too high would not be able to absorb pulsations efficiently. The elastic members 13 can further improve operability by maintaining the effect of pulsation absorption while the motor 1 is driven in the fixed duty cycle period B.

Further, when the second control method described above is employed, the protruding parts 95C contact the protruding parts 94A prior to the motor 1 being stopped through overcurrent protection, as illustrated in FIG. 8, stopping the elastic members 13 from absorbing pulsations. Consequently, the operator can feel the pulsations and can sense that the motor 1 will be halted by overcurrent protection if the load is increased further. This has the effect of encouraging the operator to lighten the force with which the circular saw 100 is pressed against the workpiece in order to avoid the occurrence of overcurrent.

When the second control method is employed, stable operability of the circular saw 100 can be maintained since the elastic members 13 continue to absorb pulsations as long as the motor 1 is operated.

There are also cases in which rotation of the saw blade 4 may be halted momentarily, such as when the saw blade 4 becomes pinched by the cut portion of the workpiece while the workpiece is being cut or when the workpiece being cut is formed of a material that the circular saw 100 according to the first embodiment is incapable of cutting. In such cases, the saw blade 4 and the deceleration mechanism 9 fixing the saw blade 4 come to a halt, but the pinion 91 and first gear 94 coupled to the motor 1 are urged to rotate. Further, a lock lever or the like is operated to disable rotation of the output shaft 1A in order to replace the end tool. Subsequently, the operator rotates the screw 19B with a wrench or the like to remove the fixture 19A from the final shaft 93, at which time a large torque is applied to the fixing member 19 via the final shaft 93 (corresponding to load P6 in FIG. 8).

Here, the rotation of the coupling 95 relative to the first gear 94 is kept within a prescribed amount, thereby preventing a large load from being applied to the elastic members 13 and extending the life of the elastic members. Specifically, since the protruding parts 95C of the coupling 95 contact the protruding parts 94A on the first gear 94, the coupling 95 is prevented from rotating more than the prescribed amount relative to the first gear 94. As shown in FIG. 7(b), the protruding parts 94A are provided so that they will be contacted by protruding parts 95C no matter which direction the coupling 95 is rotated, thereby preventing damage to the elastic members 13 regardless of the direction in which torque is applied.

Disposing the elastic members 13 inside the first gear 94 in the circular saw 100 according to the embodiment can provide the circular saw 100 with a function for absorbing the pulsating component without adding a structure in addition to the deceleration mechanism 9. Further, inclusion of the two-stage reduction mechanism can achieve the prescribed reduction ratio without use of a large gear. That is, the circular saw 100 can be made compact. Further, in the structure of the circular saw 100, the final shaft 93 for mounting the saw blade 4 is provided on the third gear 97 and the third gear 97 has a small diameter. Accordingly, the saw blade 4 can protrude farther from the base 6; that is, the saw blade 4 is provided with a greater cutting range.

Further, by providing the elastic members 13 to transmit the rotation of the first gear 94 to the intermediate shaft 92 and disposing the second gear 96 and third gear 97 between the intermediate shaft 92 and final shaft 93, the elastic members 13 are less likely to transmit the pulsating component of the motor 1 to the saw blade 4, suppressing the generation of gear noise caused by this pulsating component. In other words, since the pulsating component of the first gear 94 is absorbed before being transmitted to the second gear 96 and third gear 97, the pulsating component can be effectively absorbed and suppressed. In a configuration that provides elastic members in the second gear 96 or third gear 97, gear noise from the pulsating component of the brushless motor is generated between the pinion 91 and first gear 94 and, while the elastic members 13 may readily receive vibrations and reaction forces acting on the saw blade 4 during operations through contact with mated members, the elastic members 13 are unlikely to absorb the pulsating component of the motor 1. Employing a configuration that absorbs the pulsating component of the first gear 94 before the component is transmitted to the intermediate shaft 92, second gear 96, and third gear 97 can suppress the generation of gear noise, and the elastic members 13 can effectively absorb the pulsating component of the motor 1, since reaction forces and vibrations applied to the saw blade 4 during operations through contact with mated members are dissipated as gear noise generated through rattling between the third gear 97 and second gear 96.

Further, the configuration for accommodating elastic members 13 in the large-diameter first gear 94 allows for the use of larger elastic members 13 than if the elastic members 13 were provided in the second gear 96 or third gear 97, thereby more effectively absorbing the pulsating component.

According to the preferred embodiment, an inner rotor brushless motor can be employed by providing a mechanism for suppressing pulsations of the saw blade 4. Since the inner rotor motor 1 is smaller than an outer rotor motor, the inertia of the output shaft 1A is small and, hence, the inputted ripple voltage is more likely to be outputted as mechanical pulsations. However, by providing the deceleration mechanism 9 with a function for absorbing pulsations, the circular saw 100 can employ an inner rotor brushless motor.

Second Embodiment

Figure 9A:
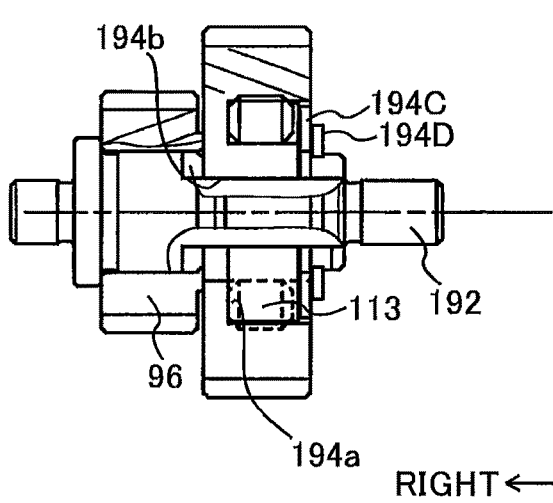
FIG. 9A is a side view, part of which indicates a cross-section, of a first gear in a circular saw according to a second embodiment of the invention.

The present invention is not limited to the deceleration mechanism 9 described above. Various embodiments of the invention can be considered. Below, a circular saw 200 and a reduction mechanism 109 according to a second embodiment will be described with reference to FIG. 9. In the second embodiment, like parts and components to those in the first embodiment are designated with the same reference numerals to avoid duplicating description. Parts and components in the second embodiment that correspond to parts and components constituting the circular saw 100 according to the first embodiment are set to reference numerals obtained by adding 100 to the reference numerals in drawings of the first embodiment.

Figure 9B:
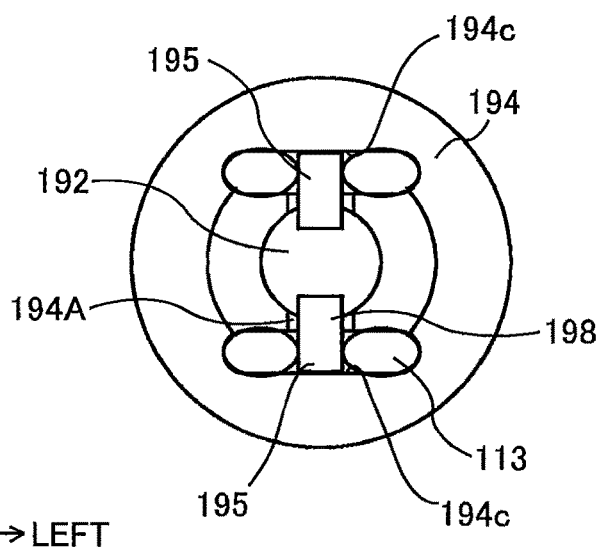
FIG. 9B is a left side view thereof.

In the second embodiment, elastic members 113 are accommodated inside a first gear 194. An encapsulating area 194a is formed in the first gear 194 by drilling the left side surface of the first gear 194 along the axial direction of the same. A hole 194b is drilled in the inside of the encapsulating area 194a. Protruding parts 194A are formed in the encapsulating area 194a such that a cross section of the encapsulating area 194a protrudes toward the central axis of the first gear 194. As shown in FIG. 9(b), two couplings 195 are fitted into side surfaces of an intermediate shaft 192 and are fixed therein. In a side view, the couplings 195 have a rectangular shape. The intermediate shaft 192 is arranged to penetrate the hole 194b. The intermediate shaft 192 is integrally configured with the couplings 195 and is incapable of rotating relative to the first gear 194.

Four of the elastic members 113 are arranged in gaps 194c formed between the couplings 195 and first gear 194. The elastic members 113 all have the same shape and contact the couplings 195 and first gear 194 during a period of nonoperation.

When the first gear 194 rotates during an operation of the circular saw 200, the elastic members 113 transmit the drive force of the first gear 194 to the intermediate shaft 192 through the couplings 195. The elastic members 113 absorb pulsations included in the drive force. When a large load is applied to the first gear 194, the couplings 195 contact the protruding parts 194A, thereby restricting rotation of the intermediate shaft 192 and couplings 195 relative to the first gear 194 to within a prescribed amount.

The above construction can obtain the same effects as the first embodiment, but the present invention is not limited to the above construction. The same effects can also be obtained using a structure that omits the couplings 95 and 195.

Third Embodiment

Figure 10A:
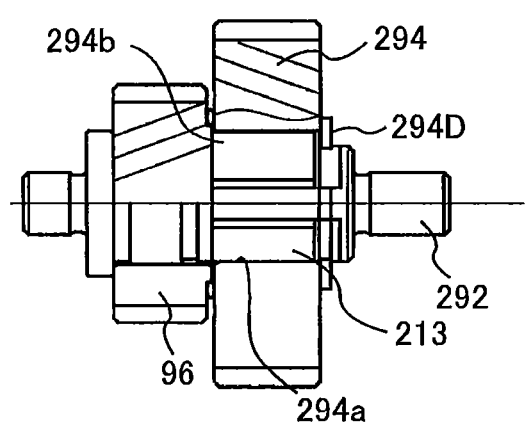
FIG. 10A is a side view, part of which indicates a cross-section, of a first gear in a circular saw according to a third embodiment of the invention.
Figure 10B:
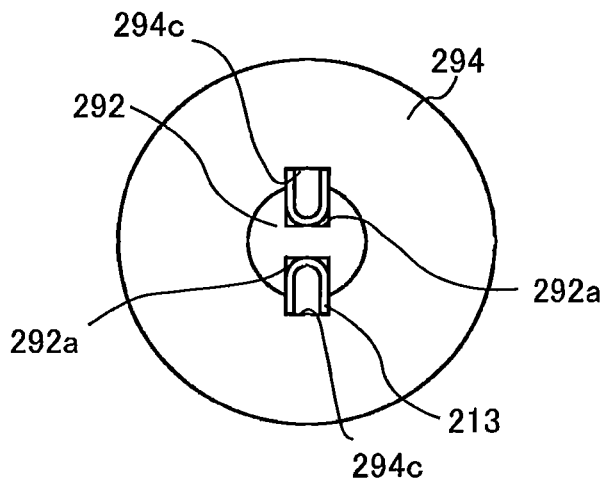
FIG. 10B is a left side view thereof.

Next, a circular saw 300 and a reduction mechanism 209 according to a third embodiment will be described with reference to FIG. 10. In the third embodiment, like parts and components to those in the first and second embodiments are designated with the same reference numerals to avoid duplicating description. Parts and components in the third embodiment that correspond to parts and components constituting the circular saw 300 are set to reference numerals obtained by adding "100" to the reference numerals in drawings of the second embodiment.

In the third embodiment, an encapsulating area 294a is formed in a first gear 294 by drilling the side surface of the first gear 294 along the axial direction of the same. A hole 294b is drilled in the inside of the encapsulating area 294a. Gaps 294c are defined inside the encapsulating area 294a such that a cross section of the encapsulating area 294a recedes along radial directions of the first gear 294. An intermediate shaft 292 is arranged to penetrate the hole 294b and is configured to be incapable of rotating relative to the first gear 294. A pair of recessed parts 292a are formed in the side surfaces of the intermediate shaft 292.

Elastic members 213 are configured of metal springs having a U-shape in a side view. Two of the elastic members 213 are arranged in spaces defined by the recessed parts 292a and the gaps 294c. The elastic members 213 contact the intermediate shaft 292 and first gear 294 during a period of nonoperation.

When the first gear 294 rotates during an operation of the circular saw 300, the elastic members 213 transmit the drive force of the first gear 294 to the intermediate shaft 292. The elastic members 213 absorb pulsations included in the drive force.

In the third embodiment, the circular saw 300 is not provided with a mechanism that suppresses rotation of the intermediate shaft 292 relative to the first gear 294 within a prescribed amount. However, since the circular saw 300 can absorb pulsations with a simple mechanism and structure, the third embodiment can achieve effects of both reducing the size of the power tool and absorbing pulsations, particularly when the load on the end tool is low.

Fourth Embodiment

Figure 11:
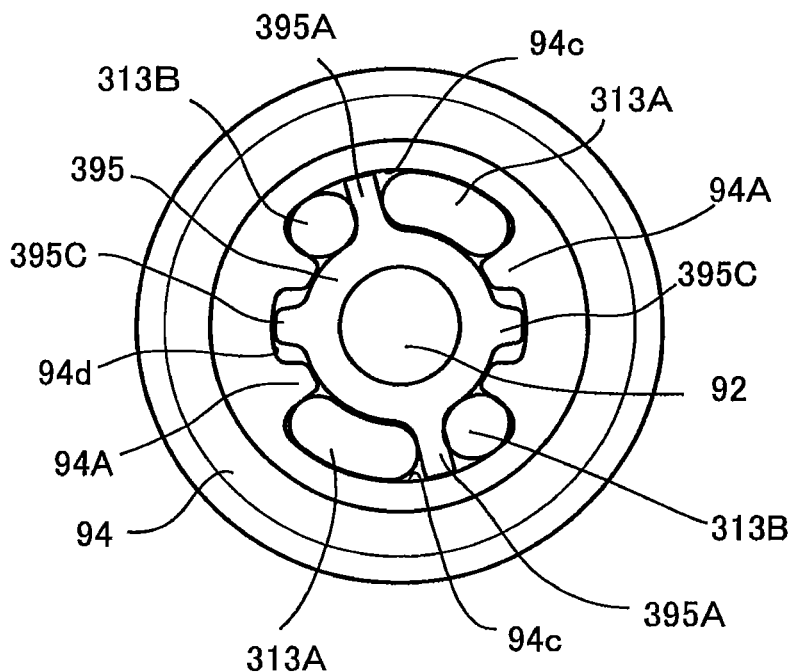
FIG. 11 is a left side view of a first gear in a circular saw according to a fourth embodiment of the invention.

Next, a circular saw 400 and a reduction mechanism 309 according to a fourth embodiment will be described with reference to FIG. 11. In the fourth embodiment, like parts and components to those in the first embodiment are designated with the same reference numerals to avoid duplicating description. Parts and components constituting the circular saw 400 according to the fourth embodiment are set to reference numerals obtained by adding "300" to the reference numerals of the corresponding parts and components in drawings of the first embodiment.

The reduction mechanism 309 according to the fourth embodiment is a variation of the deceleration mechanism 9 according to the first embodiment and differs from the first embodiment in the shape of a coupling 395, and the shape of front and rear elastic members 313 that are interposed between the coupling 395 and first gear 94 at relative forward and rearward positions in the rotating direction.

When the motor 1 is driven to rotate, the first gear 94 rotates counterclockwise in the drawing. Wall portions 395A of the coupling 395 partition the gaps 94c between pairs of protruding parts 94A into areas of different sizes. The elastic members 313 positioned in each gap 94c include a rear elastic member 313A positioned on the downstream side in the rotating direction, and a front elastic member 313B positioned on the upstream side in the rotating direction. The rear elastic member 313A has a larger dimension in the rotating direction than the front elastic member 313B. Accordingly, rotation of the pinion 91 and first gear 94 is transmitted to the coupling 395 through the large rear elastic members 313A. The rear elastic members 313A can effectively absorb pulsations in the motor 1 and suppress pulsations in the final shaft 93 to which the saw blade 4 is fixed.

By providing large rear elastic members 313A, it is possible to provide rear elastic members 313A having a spring constant sufficient for absorbing microvibrations in the pinion 91 and first gear 94 and having a long service life. Further, since the elastic members 313B on the sides of the gaps 94c that are not compressed are smaller than the rear elastic members 313A, as illustrated in FIG. 11, this arrangement avoids weakening the strength of the first gear 94 when the rotation of the first gear 94 is transmitted to the coupling 395.

Fifth Embodiment

Figure 12:
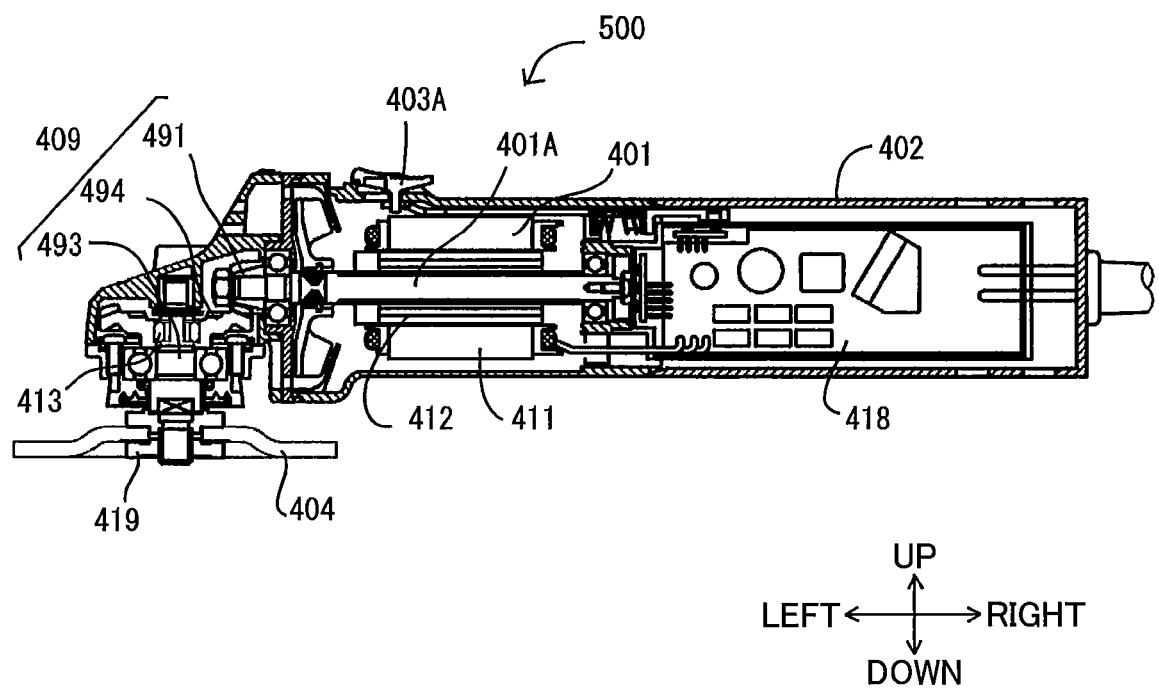
FIG. 12 is a cross-sectional view of a grinder according to a fifth embodiment of the invention.

The present invention may be applied to power tools other than circular saws. Next, a grinder 500 and a reduction mechanism 409 according to a fifth embodiment will be described with reference to FIG. 12. In the fifth embodiment, like parts and components to those in the first embodiment are designated with the same reference numerals to avoid duplicating description. Parts and components constituting the grinder 500 according to the fifth embodiment are set to reference numerals obtained by adding "400" to the reference numerals of the corresponding parts and components in drawings of the first embodiment. Upward, downward, leftward, and rightward directions related to the grinder 500 are defined by arrows in FIG. 12.

The grinder 500 is primarily provided with a motor 401, a housing 402, and an end tool 404. The housing 402 houses a control board 408, the motor 401, and a reduction mechanism 409 that transmits the drive force of the motor 401. Further, a trigger 403A for switching power to the grinder 500 on and off is provided on the top surface of the housing 402.

The motor 401 is a three-phase brushless DC motor provided with a stator 411, a rotor 412, and an output shaft 401A that is oriented in the left-right direction. The output shaft 401A is connected to the end tool 404 via the reduction mechanism 409. The end tool 404 rotates when the output shaft 1A is driven to rotate. The rotor 412 includes two pairs of permanent magnets, each pair having an N pole and an S pole, and is configured to surround the outer circumference of the output shaft 1A. The stator 411 is configured with three phase windings U, V, and W that are star-connected. The windings U, V, and W are connected to the control board 408. Note that the control board 408 has a similar construction to the control board 8 according to the first embodiment and, hence, a description of the control board 408 will be omitted.

The reduction mechanism 409 is provided with a pinion 491, a first gear 494, and a final shaft 493. The pinion 491 is fixed to the left end of the output shaft 401A. The pinion 491 is a bevel gear and functions to transmit a drive force to the first gear.

The first gear 494 is a bevel gear that is supported on the final shaft 493. The first gear 494 is disposed below the pinion 491 and is meshed with the same. The first gear 494 receives a drive force from the pinion 491 and transmits the drive force to the final shaft 493 while the axis of rotation is changed 90 degrees. Elastic members 413 are interposed between the first gear 494 and final shaft 493. The elastic members 413 are retained in the interior of the first gear 494 and function to transmit the drive force of the first gear 494 to the final shaft 493. The method of retaining the elastic members 413, the detailed structure of the contact parts, and the like are similar to those in the embodiments described above and, hence, a description will not be repeated here.

A fixing member 419 is used for detachably fixing the end tool 404 to the bottom end of the final shaft 393. The end tool 404 is a disc-shaped accessory, such as a grinding wheel or wire brush, that can perform a polishing operation or the like by rotating while in contact with the workpiece.

The fifth embodiment can obtain the same effects as the other embodiments described above. That is, the elastic members 413 can absorb the effects of pulsations in the motor 401 to suppress the occurrence of pulsations, vibrations, and noise in the end tool 404. Further, the grinder 500 of the fifth embodiment can perform operations that do not affect the finish of the workpiece. Hence, this construction not only allows for a reduction in capacitance and size of the smoothing capacitor, but also achieves normal operations of the motor 401.

Further, since the end tool 404 is halted at the beginning of an operation, the final shaft 493 to which the end tool 404 is fixed is urged to stop in the same position by inertia, and rotates relative to the first gear 494. However, the contact parts are prevented from contacting each other because the elastic members 413 compress, enabling the final shaft 493 and first gear 494 to rotate smoothly with low noise.

Further, load is applied to the end tool 404 during operations. The amount of this load is determined by the material, thickness, and the like of the workpiece. However, this load is not necessarily the same throughout the entire workpiece, but may vary. The final shaft 493 is urged to rotate relative to the first gear 494 due to such variations in load, but forces generated by these rotations are absorbed by the elastic members 413. Accordingly, the first gear 494 is unlikely to be affected by these variations in load. In this way, it is possible to suppress rattling between gear teeth and noise, deformation, and the like caused by such rattling.

The elastic members 413 also compress when an operation is halted, allowing the operation to be halted without the occurrence of impacts and the like. Further, if the fixed state of the final shaft 493 is inadvertently released while replacing the end tool 404, the elastic members 413 are prevented from deforming excessively, thereby preventing damage to the elastic members 413.

Further, the elastic members 413 can improve operability by maintaining the effect of pulsation absorption while the motor 1 is driven in the fixed duty cycle period B. When the first control method described above is employed, the deformation of the elastic members 413 is maintained to within a fixed amount prior to the motor 1 being stopped through overcurrent protection, thereby suspending pulsation absorption by the elastic members 413. Consequently, the operator can feel the pulsations and can sense that the motor 401 will be halted by overcurrent protection if the load is increased further. Hence, this has the effect of encouraging the operator to take measures in order to avoid overcurrent such as lightening the force with which the grinder 500 is pressed against the workpiece. When the second control method is employed, stable operability of the grinder 500 can be maintained since the elastic members 413 continue to absorb pulsations as long as the motor 401 is operated.

The embodiments described above employ a construction in which the first gear and the intermediate shaft or final shaft contact each other and transmit a drive force along the rotating direction through elastic members. However, the present invention is not limited to these embodiments.

For example, the coupling may have a polygon shape with rounded corners, an elliptical shape, or a shape having an eccentric part, and the elastic members may be arranged around the outer circumference of the coupling within the encapsulating area. With this construction, the elastic members are extended outward in radial directions and press against the inner circumferential surface of the first gear, transmitting a drive force to the first gear when the coupling is rotated. This construction can obtain the effect of transmitting a drive force to the intermediate shaft while also absorbing pulsations. In other words, this construction can obtain the same effects as the embodiments.

While the invention is described for a portable circular saw in the embodiments, the inventions is not limited to the embodiments. The present invention may be applied to a circular saw, a tabletop cutter, a grinder, a sander, a polisher, a planer, and a drill, and is particularly suited to tools requiring precision relative to the work surface.

In the embodiments described above, the first gear is configured to accommodate the elastic members, but the present invention is not limited to this construction. When the output shaft is the driving part and the pinion is the follow part, the elastic members may be interposed between these two parts. Similarly, elastic members may be interposed between the intermediate shaft and the second gear, between the final shaft and the third gear, or between the saw blade or other end tool and the final shaft and may be configured to absorb pulsations while transmitting the drive force.

REFERENCE SIGNS LIST

1 motor, 2 housing, 3 handle, 4 saw blade, 5 blade cover, 6 base, 7 control unit, 8 control board, 9 deceleration mechanism, 11 stator, 12 rotor, 11 Hall effect sensor, 13 elastic member, 91 pinion, 92 intermediate shaft, 93 final shaft, 94 first gear, 95 coupling, 96 second gear, 97 third gear, 100 circular saw

The invention claimed is:

1. A power tool comprising:
    a brushless motor including a rotor configured to rotate;
    a rectifier circuit configured to rectify an AC voltage;

a smoothing capacitor configured to smooth the AC voltage rectified by the rectifier circuit to a pulsating voltage;

an inverter circuit configured to perform switching operations to output the pulsating voltage to the brushless motor;

a deceleration mechanism configured to decelerate a speed of a rotation of the rotor and configured to transmit the rotation to an end tool; and an elastic member disposed between a driving portion at a rotor side and a driven portion configured to transmit a rotating force to an end tool side, the elastic member being configured to transmit the rotating force of the driving portion to the driven portion;

wherein an induced voltage is generated in the brushless motor upon rotations of the rotor, wherein the smoothing capacitor has a capacitance value so that: the AC voltage rectified by the rectifier circuit is smoothed to the pulsating voltage having a minimum value less than the induced voltage, a current flows through the brushless motor for a period during which the pulsating voltage is greater than the induced voltage, and no current flows through the brushless motor for a period during which the pulsating voltage is less than or equal to the induced voltage, wherein the elastic member includes:
  a first elastic member configured to transmit a load from the driving portion to the driven portion, the first elastic member being elastically deformed when transmitting the load from the driving portion to the driven portion; and
  a second elastic member configured to transmit a load from the driven portion to the driving portion, the second elastic member being elastically deformed when transmitting the load from the driven portion to the driving portion, wherein the deceleration mechanism includes:
  a pinion formed at an end portion of the rotor;
  the driving portion having a first gear in meshing engagement with the pinion;
  the driven portion having an intermediate shaft supporting the first gear;
  a second gear supported by the intermediate shaft and having a diameter smaller than that of the first gear; and
  a third gear in meshing engagement with the second gear, the first gear having a diameter greater than that of the third gear, wherein the first elastic member configured to transmit the rotation of the first gear to the intermediate shaft and the second elastic member configured to transmit a load from the intermediate shaft to the first gear are accommodated in the first gear while each of the first elastic member and the second elastic member is compressed by a prescribed amount.

2. The power tool according to claim 1, wherein the driving portion has at least one gear; and
wherein the driven portion has a rotation shaft supporting the at least one gear.

3. The power tool according to claim 1, wherein the end tool is a circular saw blade configured to cut a workpiece by rotating in one direction.

4. The power tool according to claim 1, wherein each of the driving portion and the driven portion has a contact portion at which the driving portion and the driven portion directly contact with each other in a rotating direction thereof when the elastic member deforms in predetermined amount.

5. The power tool according to claim 4, wherein each of the driving portion and the driven portion has a plurality of contact portions disposed in the rotating direction, the plurality of contact portions being positioned symmetrically with respect to a rotation shaft of the driven portion.

6. The power tool according to claim 5, wherein the elastic member is positioned between the plurality of contact portions, the elastic member being configured to deform in the rotating direction of the driving portion and the driven portion and further configured to deform in a radial direction of the driving portion and the driven portion, so that the elastic member restricts a displacement between a rotation axis of the driving portion and the rotation shaft of the driven portion.

7. The power tool according to claim 1, wherein the brushless motor is an inner rotor type brushless motor including a stator positioned radially outside of the rotor.

8. A power tool comprising:
  a brushless motor including a rotor configured to rotate;
  a rectifier circuit configured to rectify an AC voltage;
  a smoothing capacitor configured to smooth the AC voltage rectified by the rectifier circuit to a pulsating voltage;
  an inverter circuit configured to perform switching operations to output the pulsating voltage to the brushless motor;
  a deceleration mechanism configured to decelerate a speed of a rotation of the rotor and configured to transmit the rotation to an end tool; and
  an elastic member disposed between a driving portion at a rotor side and a driven portion configured to transmit a rotating force to an end tool side, the elastic member being configured to transmit the rotating force of the driving portion to the driven portion;
  a detection portion configured to detect a rotation state of the brushless motor; and
  a control unit configured to detect a rotation speed of the brushless motor based on a detection result of the detection portion and configured to control the switching operations of the inverter circuit based on the detected rotation speed,
  wherein the control unit is configured to perform a constant-speed control where the rotation speed of the brushless motor is maintained constant until a load applied to the end tool reaches a predetermined load,
  wherein each of the driving portion and the driven portion has a contact portion at which the driving portion and the driven portion directly contact with each other in a rotating direction thereof when a load greater than the predetermined load is applied to the end tool so that the elastic member deforms in predetermined amount, and
  wherein the elastic member has a degree of hardness so that the elastic member is deformable in a condition where the predetermined load is applied to the end tool.

9. The power tool according to claim 8, wherein the elastic member is configured to allow the contact portion of the driving portion and the contact portion of the driven portion to contact with each other when the load greater than the predetermined load is applied to the end tool.

10. The power tool according to claim 8 comprising:
  a current detection portion configured to detect a current flowing through the brushless motor; and
  a control unit configured to control the switching operation of the inverter circuit;

wherein the control unit is configured to perform a stop control to stop the brushless motor when it is determined that the current detected by the current detection portion is greater than or equal to a predetermined current, and wherein the degree of hardness of the elastic member is set such that the contact portion of the driving portion and the contact portion of the driven portion contact with each other when the current greater than the predetermined current is applied to the brushless motor.

11. The power tool according to claim 8 comprising:

a current detection portion configured to detect a current flowing through the brushless motor; and a control unit configured to control the switching operation of the inverter circuit;

wherein the control unit is configured to perform a stop control to stop the brushless motor when it is determined that the current detected by the current detection portion is greater than or equal to a predetermined current, and wherein the degree of hardness of the elastic member is set such that the contact portion of the driving portion and the contact portion of the driven portion contact with each other when the current slightly less than the predetermined current is applied to the brushless motor.

* * * * *